US009453405B2

(12) United States Patent
Reid

(10) Patent No.: US 9,453,405 B2
(45) Date of Patent: Sep. 27, 2016

(54) NOISE ISOLATION TOOL

(71) Applicant: FMC Technologies, Inc., Houston, TX (US)

(72) Inventor: Jude Reid, Calgary (CA)

(73) Assignee: FMC Technologies, Inc., Houston, TX (US)

( * ) Notice: Subject to any disclaimer, the term of this patent is extended or adjusted under 35 U.S.C. 154(b) by 597 days.

(21) Appl. No.: 13/776,192

(22) Filed: Feb. 25, 2013

(65) Prior Publication Data

US 2014/0238664 A1    Aug. 28, 2014

(51) Int. Cl.
*E21B 47/01* (2012.01)
*G01V 1/52* (2006.01)

(52) U.S. Cl.
CPC ............. *E21B 47/011* (2013.01); *G01V 1/523* (2013.01)

(58) Field of Classification Search
CPC ..... E21B 47/00; E21B 47/011; E21B 47/101
See application file for complete search history.

(56) References Cited

U.S. PATENT DOCUMENTS

| 3,982,606 | A | * | 9/1976 | Berry | G01V 1/523 |
| | | | | | 166/241.5 |
| 4,353,122 | A | * | 10/1982 | Cubberly, Jr. | 367/25 |
| 4,850,450 | A | * | 7/1989 | Hoyle et al. | 181/102 |
| 5,343,001 | A | * | 8/1994 | Cowles et al. | 181/102 |
| 7,712,520 | B1 | * | 5/2010 | Hettes | E21B 37/00 |
| | | | | | 166/173 |
| 2012/0018149 | A1 | * | 1/2012 | Fidan et al. | 166/250.03 |

* cited by examiner

*Primary Examiner* — William P Neuder
(74) *Attorney, Agent, or Firm* — Amerson Law Firm, PLLC

(57) ABSTRACT

Generally, the present disclosure is directed to noise isolation tools that may be used to minimize or even eliminate the detrimental effects that rogue noise events may have on the noise data acquired by a noise logging tool during a noise logging operation. In one illustrative embodiment, a noise isolation tool that is adapted to be used in a noise logging operation is disclosed, the noise isolation tool including, among other things, a body and at least one noise suppression element mounted on the body, the at least one noise suppression element having a substantially circular disc shaped configuration that is adapted to extend radially across at least a portion of a width of an annular space between the body and an inside surface of a wellbore casing during the noise logging operation.

34 Claims, 10 Drawing Sheets

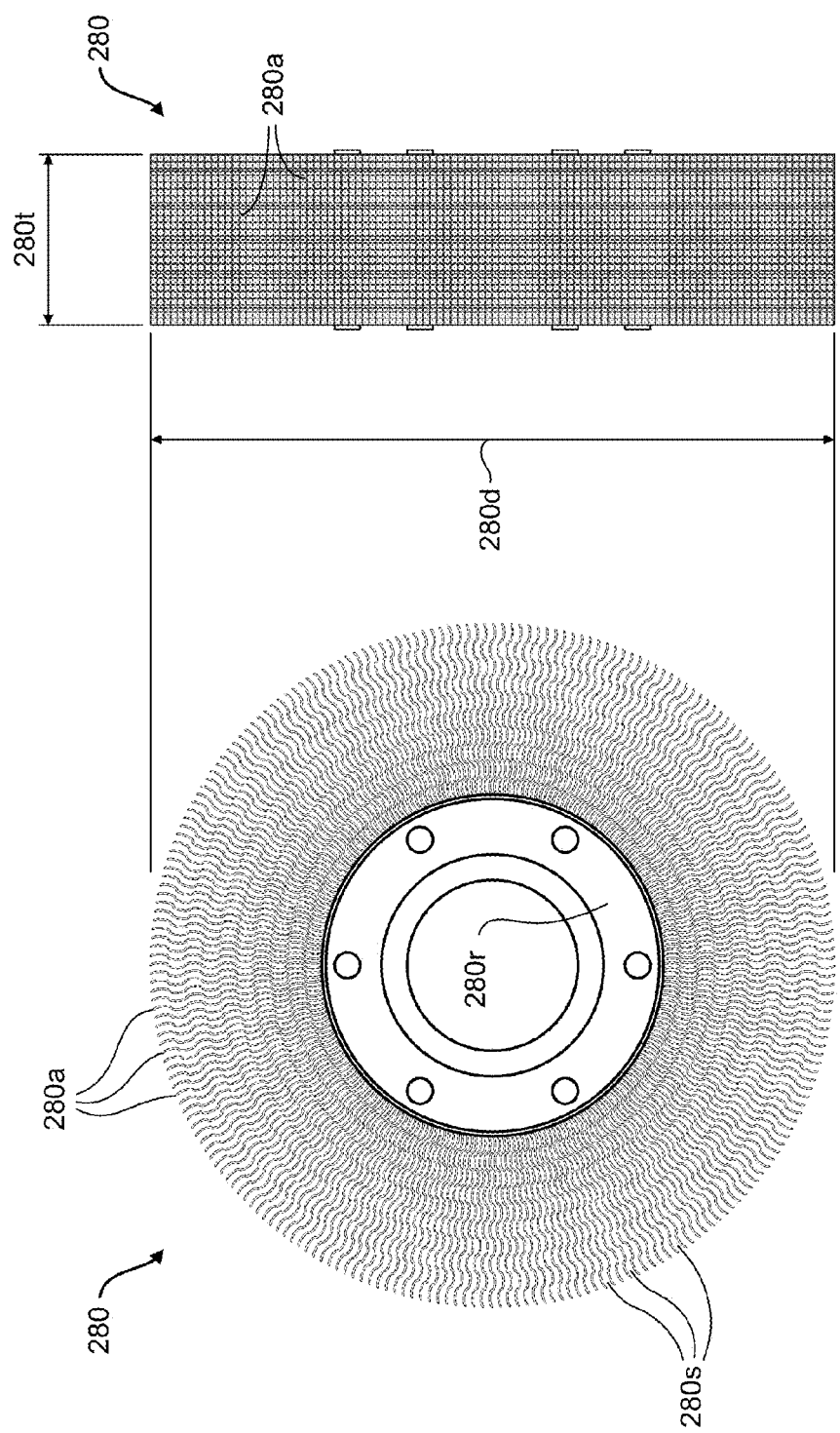

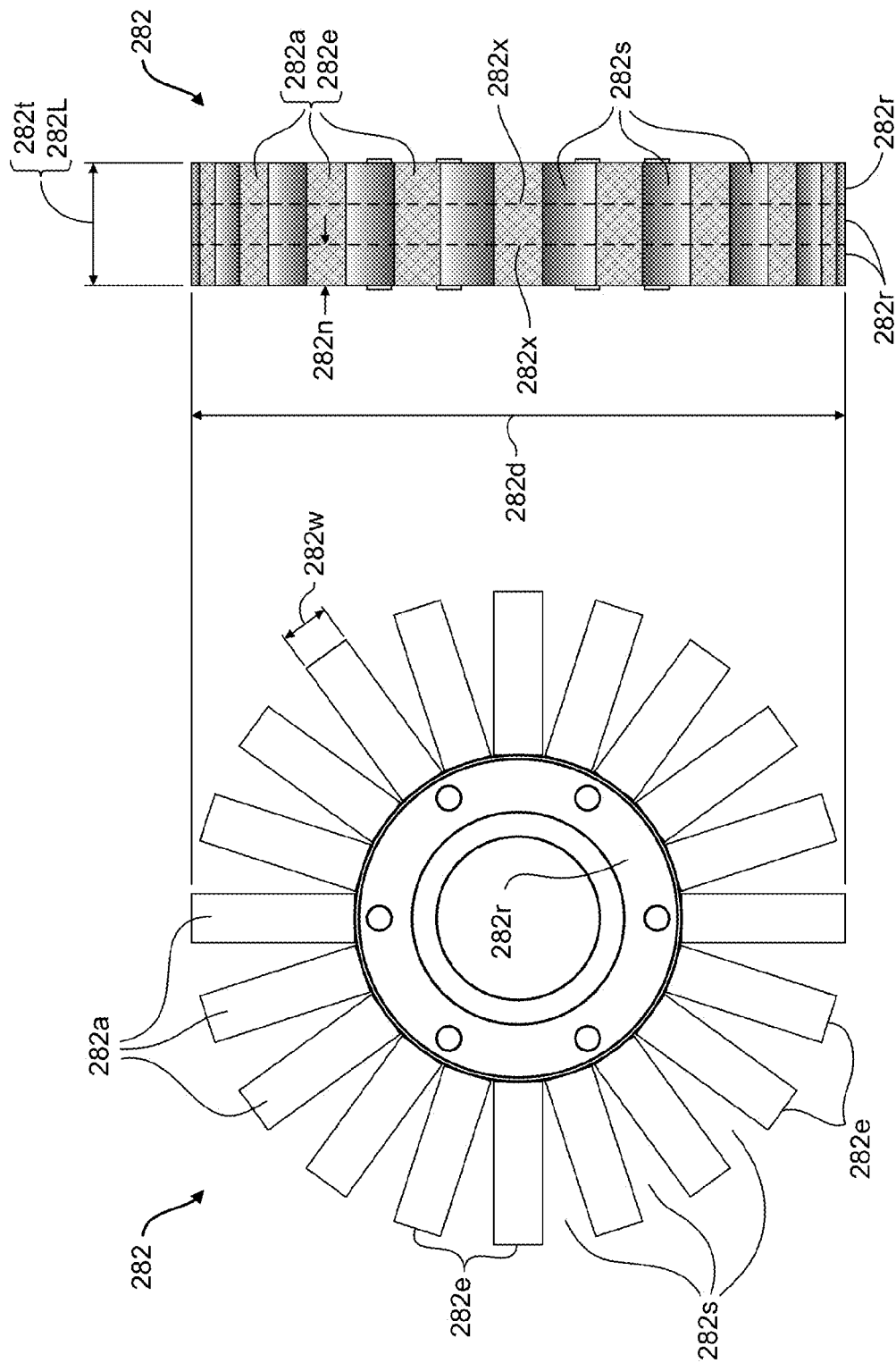

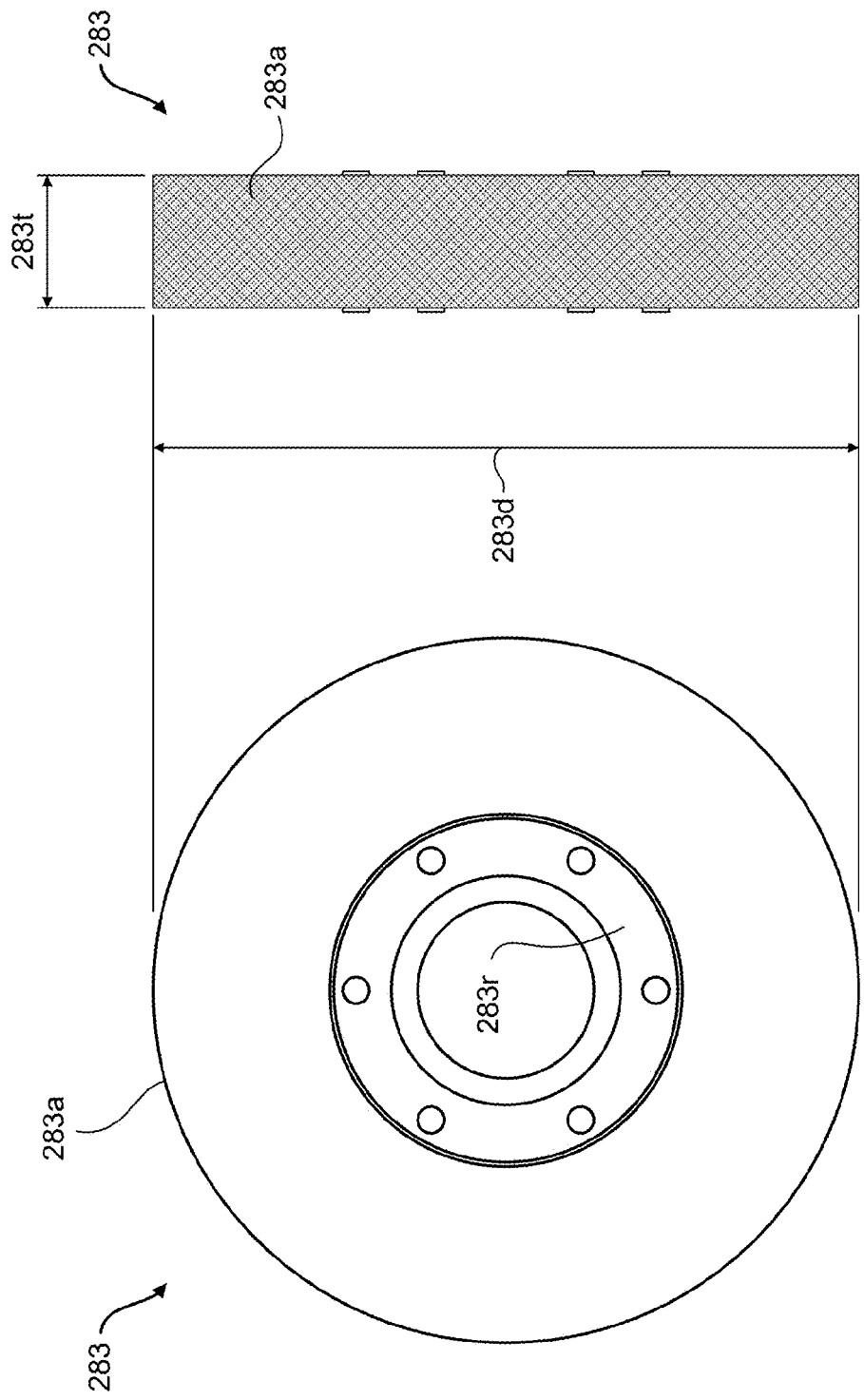

NOISE ISOLATION TOOL

BACKGROUND

1. Field of the Disclosure

The present subject matter is generally directed to wireline tools that are used for well logging operations, and more specifically to a noise isolation tool that may be used during a noise logging operation.

2. Description of the Related Art

Since the earliest wells were constructed during the 19th Century, controlling what would otherwise be an uncontrolled flow or migration of hydrocarbons to the surface has been an ongoing challenge to the oil and gas industry. In modern oil and gas wells, such uncontrolled flow or migration can often be attributed to inadequate or improper isolation of the various producing zones through which a wellbore has been drilled. For example, in some cases, poor zonal isolation can lead to the uncontrolled flow of gas and/or liquid to the surface by way of the annulus between the production casing (or if present, an intermediate casing) and the surface casing. Such uncontrolled flow through the surface casing annulus is sometimes referred to as internal migration, or surface casing vent flow (SCVF). In other cases, a flow of gas may be detectable at the surface outside of the outermost casing string, i.e., the surface casing, or if present, the conductor casing of the well. Such flow outside of the outermost casing is sometimes referred to as external migration, seepage, or more simply, gas migration (GM). Gas migration can be a serious occurrence if there is there is a possibility of fire, a public safety hazard, and/or environmental damage, such as groundwater contamination and the like.

Many factors can contribute to the uncontrolled flow of gas up a wellbore. For example, conditions directly related to the initial drilling of the wellbore, the casing and/or cementing design, the completion techniques utilized, and/or the age of a wellbore can all influence the eventual uncontrolled flow of gas in a well. Moreover, poor casing quality, improper displacement of drilling mud during drilling activities, poor cement slurry design and/or pumping practices, damage to the primary cement job after drilling, and the recovery methods used on the a well, such as steam assisted gravity drainage (SAGD) and/or other steam flood regimes, can also contribute to the creation of gas flow paths in the wellbore. Some of these factors are briefly discussed below.

In some wells, lower quality casing materials, or casing strings that are improperly placed, i.e. over torque collars and the like, can create leakage conditions which can thereby locally charge formations to create the surface casing vent flow and/or gas migration issues described above. Furthermore, improper circulating and wellbore conditioning practices can sometimes leave a mud column, or a mud cake, between the casing and the formation, which may limit the ability of the primary cement column to create an effective bond that would normally be required to inhibit and stop undesirable gas flow.

Poor cement slurry designs and improper or inadequate cement placement during the cementing operation can sometimes cause channeling effects in the cement/mud column, thereby creating a flow path in the wellbore. Improper squeeze cementing practices can contribute to gas-infused cement columns, which may also leave a flow path for gas. Additionally, damage to the cement column can sometimes occur after the primary cementing operation has been completed on a well. For example, pressures that are exerted on the wellbore during routine completion operations, such as pressure testing and/or hydraulic fracturing, as well as various thermal operational modes, such as steam assisted gravity drainage and/or cyclic steam production schemes, can oftentimes compromise the cement quality. Such operational scenarios are of particular concern in those cases where the initial quality of the cement column was marginal or poor, as further deterioration of the cement quality can potentially leading to undesirable gas flow paths in the wellbore.

Another factor that very often contributes to the type of surface casing vent flow and gas migration scenarios described above is the age of a well, as an overall deterioration of the wellbore can occur gradually over time. For example, production operations on the well may take place for extended periods of time, or perhaps even continuously for the entire life of the well, thus compounding the effects of the production and/or operational mechanisms described above. Furthermore, workover operations may have been performed on the well so as to open new pay zones within the reservoir, thus creating the potential for further zonal isolation problems. Moreover, the extended age of a well would generally serve to exacerbate any of the above-described marginal casing and/or cementing quality issues that might be present from the initial completion operations on the well. For example, some studies indicate that, of offshore wells located on the outer continental shelf in the Gulf of Mexico, there is a probability that 50% or more of wells that are at least 15 years or older have occurrences of uncontrolled gas flow, such as surface casing vent flow and/or gas migration.

The sources of uncontrolled gas flow from a wellbore can vary. For example, in some instances, surface casing vent flow and/or gas migration may be caused by gas moving through and/or from the producing formation, formations with commercial potential that are up-hole of the producing formation, or from non-commercial gas bearing zones or "stringers". Furthermore, the flow characteristics of SCVF/GM occurrences can also fluctuate depending on a variety of well conditions, such as restriction points, surging, inter-zonal movement and charging, source depletion, and the presence of near wellbore and/or near formation flow paths.

However, irrespective of the source, many national or state/provincial regulations require that any such sources of uncontrolled gas flow be located and repaired, because in many oil and gas wells, the annulus between the surface casing of a well and the next smaller casing set inside of the surface casing therein must be left open to atmosphere. Accordingly, operators are often required to test the surface casing for a vent flow or gas migration, and effect repairs in accordance with applicable directives and regulations. Moreover, each of the various flow characteristics noted above (e.g., surging, inter-zonal movement, etc.) present different challenges in determining the lowest possible source within the wellbore that may be targeted for SCVF/GM repairs.

With the variety of conditions associated with uncontrolled gas flow around a wellbore, and the many different flow paths for gas to surface, the identification, repair and remediation of SCVF/GM issues can be a highly challenging process. Of paramount importance is the initial step of SCVF/GM source identification—in other words, properly pinpointing the location from which the gas leak and/or migration originates. Absent a reasonably conclusive identification of the gas source, any subsequent repair and/or remediation steps may only be partially successful, or in some situations may even be completely futile, depending on the overall characteristics of the wellbore.

One approach that is commonly used for detecting the location of SCVF/GM gas sources is to run a noise/temperature log on a well, which is often performed in conjunction with other well logging operations, such as a cement bond log and/or a gas identification neutron log and the like. Generally, noise/temperature logs are acquired during a typical well logging operation, and are commonly run by obtaining temperature data while running into a wellbore (i.e., down the hole), and obtaining noise samples while running back out of the wellbore (i.e., up the hole). During noise sample acquisition, the samples are recorded through a series of preselected, regularly spaced station stops using a pre-set recording interval at each station stop. Recording depth typically starts at the plugged back total depth (PBTD) of the well, and continues progressively to each regularly spaced station stop and up to surface. The noise logs are then analyzed to find occurrences of the type of audible characteristics and/or noise spectra that is most often associated with such undesirable gas flow events.

FIG. 1 schematically illustrates an exemplary prior art noise logging tool arrangement that has been used in an effort to detect and isolate sources of uncontrolled gas flow that may lead to surface casing vent flow and/or gas migration in a wellbore. FIG. 1 depicts a wellbore 150 that includes a casing 101, such as a production casing and the like, that is set in a formation 100 using a cement sheath 103. During a typical noise logging survey, a noise logging tool 110 is lowered down the bore 102 of the production casing 101 using a wireline 111, which is used to transmit noise logging data from the noise logging tool 110 to a wireline service vehicle (not shown) positioned at the surface near the wellhead of the wellbore 150. The wireline 111 is also used to support the noise logging tool 110 during the logging operation, and to move the noise logging tool 110 up and down the bore 102 of the production casing 101 between each of the pre-selected station stops described above.

As shown in FIG. 1, the noise logging tool 110 is positioned at a representative station stop within a zone of interest, or targeted noise logging zone 140, where a relevant gas source 120 that may cause an uncontrolled flow of gas 121 may be located. In some cases, the zone of interest 140 over which the noise logging data is acquired will extend above and below the noise logging tool 110 as shown in FIG. 1. The overall height of the zone of interest—i.e., the height corresponding to the distance between adjacent station stops—that may range on the order of 1-10 meters, although the specific overall height of the targeted noise logging zone 140 may also be larger or smaller, depending on various logging parameters, such as the type and design of the noise logging tool 110, the configuration of the wellbore 150 (e.g., the number and/or size of casings present in the zone 140), the type of strata in the formation 100, and the like. For example, in one well-known industry standard, the distance between station stops is approximately 5 meters, wherein 30-second sound samples are obtained at each station stop, however smaller station-stop distances may be chosen according to the specific well and/or flow conditions. During the pre-set recording interval, any noise that is created by the gas source 120, indicated in FIG. 1 as radiating sound waves 122, is detected by the noise logging tool 110, and the associated noise data is transmitted to the wireline service vehicle at the surface via the wireline 111.

There are, however, some limitations on the use of currently available noise logging technology for SCVF/GM source isolation, which can sometimes inhibit efforts to accurately pinpoint the gas source locations. For example, extraneous noises that are unrelated to the SCVF/GM source noise (generally represented in FIG. 1 as sound waves 130a traveling down the wellbore 150 and sound waves 130b traveling up the wellbore 150) sometimes occur during the noise logging operation. Such extraneous noises 130a, 130b are sometimes referred to as "rogue noise events," and can often interfere with and/or affect the noise samples obtained by the noise logging tool 110 in the targeted noise logging zone 140 during the logging operation. Rogue noise events can include, among other things: noises generated by downhole tools; noises caused by tool movement; noises caused by debris inside the wellbore hitting a tool; and restrictive processes in the cement sheath 103 that can generate loud audible responses, such as formation sloughing in creating smaller flow channels, worm-hole channeling in the cement sheath 103, and the like. Such situations may lead to changes in the volumetric flow of gas behind the casing 101, e.g., by changing the flow diameter, changing the amount of gas flow (as with additional flow sources and the like), increasing the flow profile, etc.

The interpretation of the noise data obtained using the noise logging tool 110 at each depth of acquisition is generally adversely affected by any such rogue noise events that may exist during noise data acquisition. Since the noise data acquired by the noise logging tool 110 may contain the noise from an important SCVF/GM gas source related noise (such as that represented by the sound waves 122 from gas source 120 shown in FIG. 1) as well as all other detectable rogue noise events (such as those represented by the sound waves 130a, 130b), interpretation of the noise logging data may be difficult, and can often be incorrect. Furthermore, in some cases, rogue noise events can appear to have the same audible characteristics and/or noise spectra of gas movement within the wellbore 150, the cement sheath 103, or the adjacent formation. Moreover, irrespective of the noise source, it should be appreciated that sound waves readily propagate up and down the wellbore 150 via the various media and materials in and around the wellbore 150, such as any fluid in the wellbore 150, the well casing 101, the cement sheath 103, and the adjacent formation 100, wherein the majority of such noise propagation is believed to occur in the wellbore fluid and/or the well casing. Due to this sound wave propagation, the rogue noise events 130a, 130b could initiate from outside of the targeted noise logging zone 140. Furthermore, the true source and location of the noise can be masked to some degree, thus making it difficult to accurately assess whether the noise source is originating within the targeted noise logging zone 140 being logged, or in some other source interval above or below the tested zone 140, thus potentially leading to an improper interpretation of the noise data, and an erroneous identification of a relevant SCVF/GM source.

In other instances, the noise logging tool 110 can detect problematic noise events (e.g., the sound waves 130a, 130b) that are directly or indirectly related to other SCVF/GM sources around the wellbore 150 which are located outside of the targeted noise logging zone 140 that is currently being logged. For example, in some cases, the noise logging tool 110 may detect a noise that is generated by an SCVF/GM source that is either above or below the targeted noise logging zone 140 being tested, but which propagates up or down the wellbore 150 as described above. Such SCVF/GM sources located outside of the targeted noise logging zone 140 can also influence the noise data being acquired, thus making it difficult to accurately determine whether or not a relevant SCVF/GM source is present somewhere within the zone 140 that is being logged, because, even though a given wellbore noise may be related to the actual flow of problem gas, the sound associated with the release of gas from the formation into an annular space between the casing and the formation annulus may be masked by such rogue noise events.

In other cases, a rogue noise that is detected by the noise logging tool 110 may be indirectly associated with a relevant SCVF/GM source. For example, the noise logging tool 110 may detect noise that is caused by a flow of uncontrolled gas, such as the flow 121, after the gas has left the source 120 and as the flow 121 moves up the wellbore 150 through an annulus outside of the casing 101, a flow channel in the cement sheath 103, and/or around any other flow restrictions that may be present within or adjacent to the wellbore 150. In some instances, this could include charge and release events associated with a charging gas void in the cement sheath 103, which may release only under specific pressure conditions. Since such noise occurrences are also caused by a flow of gas in and around the wellbore 150, they can sometimes mask the true location of any uncontrolled gas source coming from the surrounding formation 100, as it can be very difficult to distinguish such noises from, for example, the noise 122 generated by a relevant gas source 120.

Accordingly, there is a need to develop and implement new designs for and methods of using downhole tools that facilitate the performance of noise logging operations, and which address and mitigate at least some of the problems that are associated with locating the sources of uncontrolled gas flows in and around oil and gas wellbores, as described above.

SUMMARY OF THE DISCLOSURE

The following presents a simplified summary of the present disclosure in order to provide a basic understanding of some aspects disclosed herein. This summary is not an exhaustive overview of the disclosure, nor is it intended to identify key or critical elements of the subject matter disclosed here. Its sole purpose is to present some concepts in a simplified form as a prelude to the more detailed description that is discussed later.

Generally, the present disclosure is directed to noise isolation tools that may be used to minimize or even eliminate the detrimental effects that rogue noise events may have on the noise data acquired by a noise logging tool during a noise logging operation. In one illustrative embodiment, a noise isolation tool that is adapted to be used in a noise logging operation is disclosed, the noise isolation tool including, among other things, a body and at least one noise suppression element mounted on the body, the at least one noise suppression element having a substantially circular disc shaped configuration that is adapted to extend radially across at least a portion of a width of an annular space between the body and an inside surface of a wellbore casing during the noise logging operation.

In another exemplary embodiment of the present disclosure, a noise logging tool includes a body and a noise suppression element mounted on the body, wherein the noise suppression element includes, among other things, a plurality of substantially radially oriented noise attenuation members circumferentially mounted on the noise suppression element, each of the plurality of substantially radially oriented noise attenuation members being adapted to extend radially across a width of an annular space between the body and an inside surface of a wellbore casing, at least some of the plurality of substantially radially oriented noise attenuation members being adapted to contact the inside surface during a noise logging operation.

In a further illustrative embodiment, a noise isolation tool is disclosed that includes, among other things, a body and at least one noise suppression element mounted on the body, wherein the noise isolation tool is adapted to be operatively coupled to a noise logging tool and the at least one noise suppression element is adapted to attenuate sound waves traveling along a wellbore of a well when the noise isolation tool and the noise logging tool operatively coupled thereto are positioned in the wellbore during a noise logging operation.

Another exemplary embodiment of the presently disclosed subject matter is a noise logging system that is adapted to perform a noise logging operation on a wellbore, wherein the disclosed system includes, among other things, a noise logging tool and a noise isolation tool that is operatively coupled to the noise logging tool, the noise isolation tool having at least one noise suppression element that extends substantially radially away from a body of the noise isolation tool.

Also disclosed herein is a noise logging system that is adapted to perform a noise logging operation on a wellbore. The disclosed noise logging system includes, among other things, a noise logging tool and a noise isolation tool that is operatively coupled to said noise logging tool, the noise isolation tool including at least one noise suppression element mounted on a body of the noise isolation tool. Additionally, the at least one noise suppression element has a substantially circular disc shaped configuration that is adapted to extend radially across at least a portion of a width of an annular space between the body and an inside surface of a casing of the wellbore.

In yet another illustrative embodiment, a method for performing a noise logging operation is disclosed that includes operatively coupling a noise logging system to a wireline, the noise logging system including a first noise isolation tool that is operatively coupled to a noise logging tool. The disclosed method also includes, among other things, positioning the noise logging system in a targeted noise logging zone with the wireline and attenuating sound waves originating from noise sources located outside of the targeted noise logging zone with the first noise isolation tool while acquiring noise logging data originating from noise sources located within the targeted noise logging zone with the noise logging tool.

BRIEF DESCRIPTION OF THE DRAWINGS

The disclosure may be understood by reference to the following description taken in conjunction with the accompanying drawings, in which like reference numerals identify like elements, and in which:

FIGS. 4A-4H are end and side elevation views of various illustrative embodiments of noise suppression elements that may be used with the noise isolation tools of the present disclosure.

Figure 1:
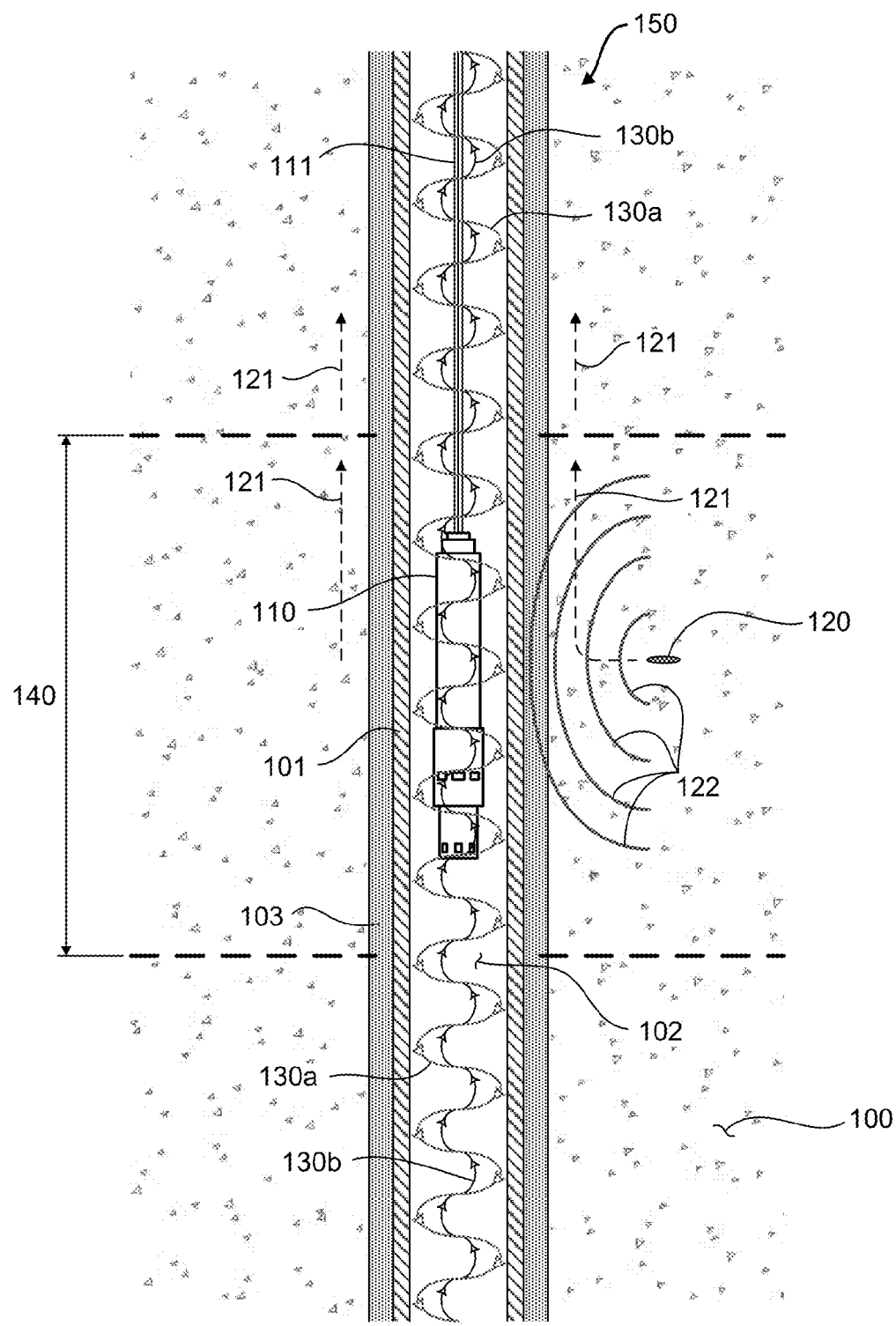
FIG. 1 is a schematic side/section view of an illustrative prior art noise logging system during a noise logging operation.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the present subject matter are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various systems, structures and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the subject matter disclosed herein relates to noise isolation tools that may be used to attenuate sound waves associated with rogue noise events that occur during a noise logging operation. For example, in certain exemplary embodiments, the noise isolation tools of the present disclosure may be used to minimize, or even substantially block, the rogue noise event sound waves traveling up and/or down a wellbore during the noise logging operation from entering a zone of interest where a noise logging tool is acquiring noise data on the wellbore and surrounding formation. In this way, the potentially detrimental effects of rogue noise events on the noise data that is collected by the noise logging tool during the logging operation may be minimized, or even eliminated, thus increasing the accuracy and interpretability of the noise data. Depending on the specific application and associated tool design considerations, the illustrative noise isolation tools of the present disclosure may attenuate the sound waves caused by rogue noise events by means of sound wave absorption, sound wave scattering, or by a combination of absorption and scattering.

Figure 2A:
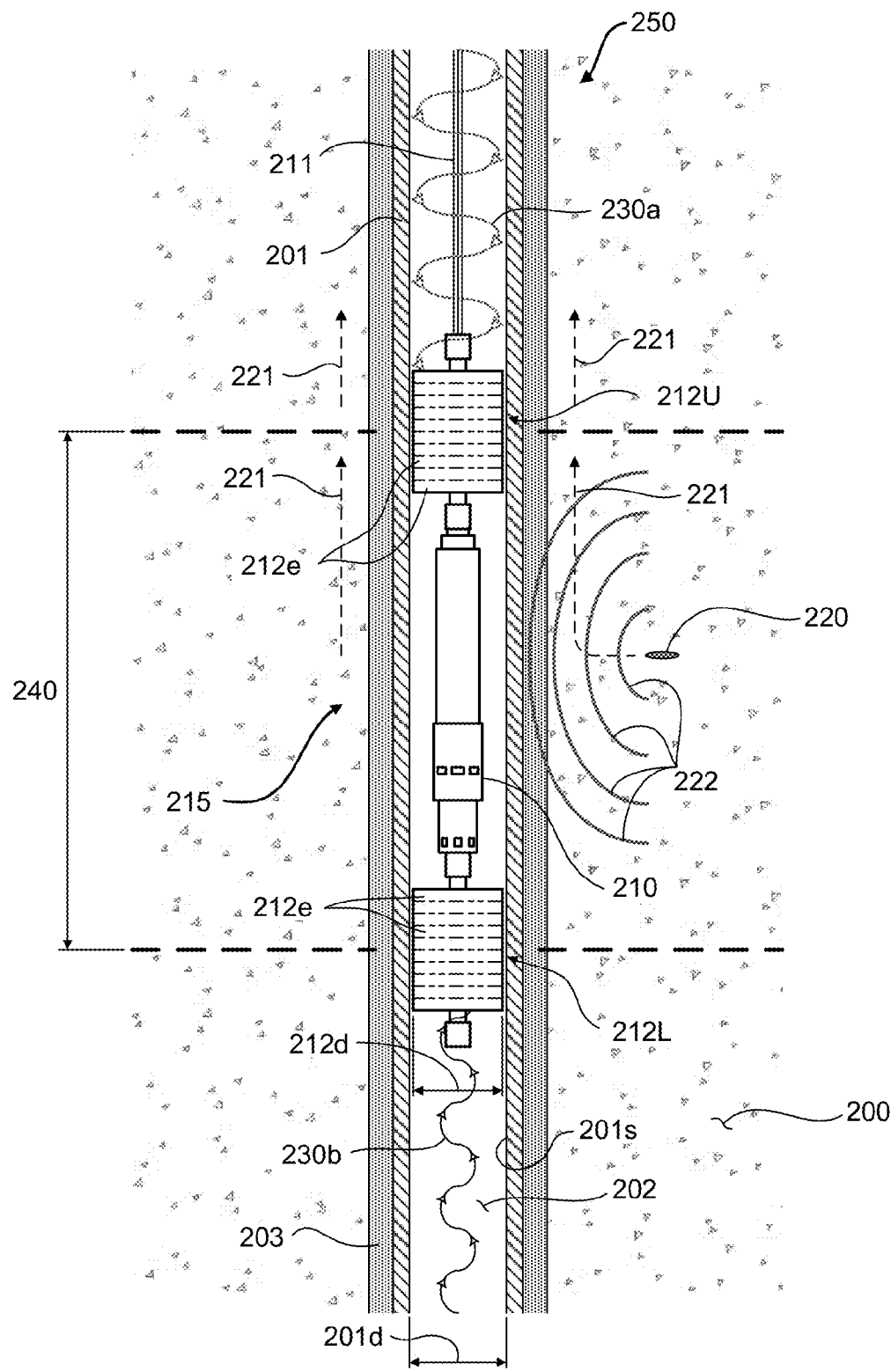
FIG. 2A is a schematic side/section view of an illustrative noise logging system of the present disclosure during a noise logging operation.
Figure 2B:
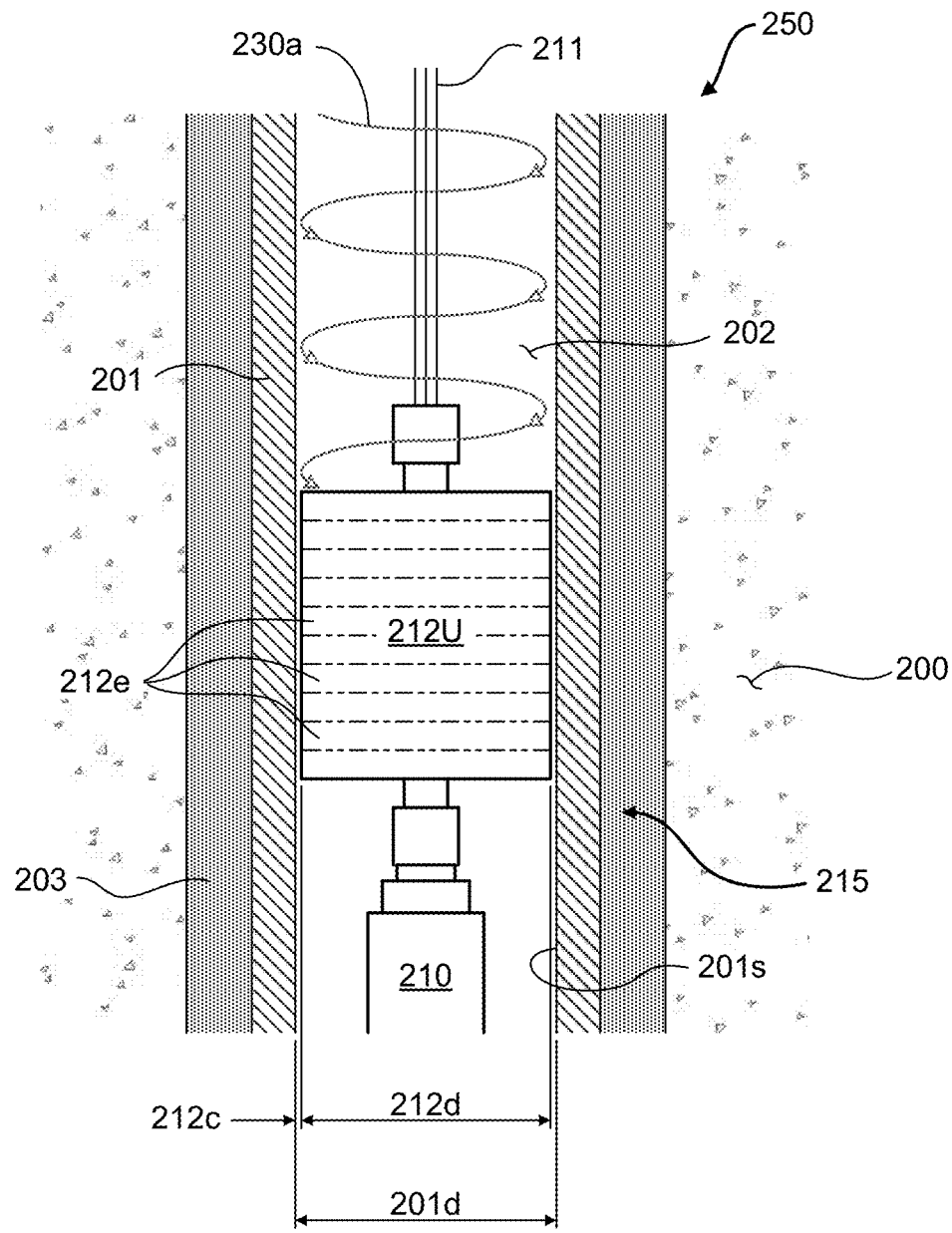
FIG. 2B is a close-up schematic side/section view of the illustrative noise isolation tool used with the noise logging system shown in FIG. 2A.

It should be noted that, where appropriate, the reference numbers used in describing the various elements shown in the illustrative embodiments of FIGS. 2A and 2B substantially correspond to the reference numbers used in describing the corresponding elements illustrated in FIG. 1 above, except that the leading numeral for those elements has been changed from a "1" to a "2." For example, the relevant gas source "220" shown in FIG. 2A corresponds to the relevant gas source "120" of FIG. 1, the wireline "211" shown FIGS. 2A and 2B corresponds to the wireline "111" of FIG. 1, the production casing "201" shown FIGS. 2A and 2B corresponds to the production casing "101" of FIG. 1, and so on. Accordingly, the reference number designations used to identify some elements of the presently disclosed subject matter may be illustrated in the FIGS. 2A and 2B, but may not be fully described in the following disclosure. In those instances, it should be understood that any numbered elements shown in FIGS. 2A and 2B which are not described in detail below substantially correspond with their like-numbered counterparts illustrated in FIG. 1 and described in the associated disclosure set forth above.

FIG. 2A schematically illustrates a side/section view of one illustrative noise logging system 215 of the present disclosure, which includes a noise logging tool 210 that is supported by a wireline 211 inside of the bore 202 of the production casing 201 of a wellbore 250 during a noise logging operation. As shown in FIG. 2A, the noise logging tool 210 is positioned within a targeted noise logging zone 240, sometimes referred to herein as an "isolation interval 240," where a relevant gas source 220 that may lead to an SCVF/GM occurrence (as described above) may be located. In some embodiments, the noise logging system 215 may include a lower noise isolation tool 212L that is positioned below the lower end of the noise logging tool 210. The lower noise isolation tool 212L may be adapted to reduce the effects of any sound waves 230b associated with rogue noise events in and/or around the portion of the wellbore 250 that is located below the noise logging tool 210 by attenuating the sound waves 230b before they enter the isolation interval 240. In this way, the lower noise isolation tool 212L may substantially reduce, or even substantially eliminate, any detrimental effects that the sound waves 230b may have on the noise data that is acquired by the noise logging tool 210 during the noise logging operation.

In certain other illustrative embodiments of the noise logging system 215 disclosed herein, an upper noise isolation tool 212U may be positioned above the upper end of the noise logging tool 210, as is shown in FIG. 2A. The upper noise isolation tool 212U may in turn be operatively coupled to the wireline 211, which is used to support the noise logging system 215, move the noise logging tool 210 up and/or down the bore 202 of the production casing 201 between preselected station stops where noise logging operations may be performed, and to transmit any well logging data to the surface. As with the previously described lower noise isolation tool 212L, the upper noise isolation tool 212U may be similarly adapted to attenuate any sound waves 230a that are moving down the wellbore 250 which may associated with rogue noise events occurring in and/or around the portion of the wellbore 250 that is located above the targeted noise logging zone 240.

The upper and lower noise isolation tools 212U, 212L may include one or more noise suppression elements 212e (schematically illustrated in FIG. 2A), which, in certain embodiments, may be adapted to attenuate the sound waves 230a or 230b that are traveling through the wellbore 250 from above or below the targeted noise logging zone 240, respectively. The upper and lower noise isolation tools 212U, 212L may have substantially the same configuration, or they may have different configurations depending on the particular application. Additional aspects of some exemplary embodiments of the noise isolation tools 212U, 212L and the noise suppression elements 212e, such as materials, shape, size, configuration, and/or component arrangement, will be discussed in further detail below in conjunction with FIGS. 3A-3C and FIGS. 4A-4H.

In those embodiments of the disclosed noise logging system 215 wherein upper and lower noise isolation tools 212U, 212L are operatively coupled (either directly or via intermediate structures (not shown)) to the respective upper and lower ends of the noise logging tool 210, the sound waves 230a, 230b associated with the occurrence of rogue noise events above and/or below the isolation interval 240 where noise logging operations are being performed may be attenuated to a level that substantially reduces the detrimental effects that such rogue noise events may have on the noise data acquired by the noise logging tool 210. Furthermore, as is schematically illustrated in FIG. 2A, the noise isolation tools 212U, 212L may even substantially block the sound waves 230a, 230b from entering the isolation interval 240. This noise blocking and/or noise isolation effect may thus substantially prevent the noise logging tool 210 from detecting the rogue noise event sound waves 230a, 230b, thereby enabling the noise logging tool 210 to more accurately acquire "clean" noise data—that is, substantially without the data confusion that may often be associated with extraneous rogue noise events—from any relevant SCVF/GM sources that may be located within the targeted noise logging zone 240. For example, when the rogue noise sound waves 230a traveling down the wellbore 250 may be substantially blocked from above by the upper noise isolation tool 212U, and the rogue noise sound waves 230b traveling up the wellbore 250 may be substantially blocked from below by the lower noise isolation tool 212L, most of the noise data collected by the noise logging tool may be associated only with those noises that are generated within the targeted noise logging zone 240, such as the noise data from the sound waves 222 that are generated by the flow of gas 221 from the gas source 220.

In certain illustrative embodiments, the noise suppression elements 212e may extend in a substantially radial direction from a body 260 of the noise isolation tools 212U, 212L and across at least a portion of a width 201w of an annular space 201a between the inside surface 201s of the production casing 201 and the body 260 (see, e.g., FIGS. 3A-3C, described below). For example, the noise suppression elements 202e may extend substantially radially across at least about 30-50% of the width 201w of the annular space 201a, whereas in other embodiments, the noise suppression elements 202e may extend across 50-90%, or more even more, of the width 201w, thereby substantially reducing the effect that any rogue noise events may have on the noise readings obtained by the noise logging tool 210 during a noise logging operation.

In at least some other embodiments, the noise suppression elements 212e may extend across substantially the entire width 201w, for example, approximately 95-100%, of the annular space 201a, such that the noise suppression elements 212e may closely approach, or even contact, the inside surface 201s. In such embodiments, any rogue noise event sound waves 230a, 230b travelling up and/or down the bore 202 of the production casing 201 may be substantially prevented from bypassing the noise isolation tools 212U, 212L, or at least substantially minimized, depending on the overall materials and configuration of the noise suppression elements 212e, as will be further described below. Generally, therefore, the diameter 212d of the noise suppression elements 212e may be adjusted as required so as to extend as closely as possible to the inside surface 201s of the casing 201, however substantially without impeding the movement of the noise isolation tools 212U, 212L into and/or out of the wellbore 150.

For example, when the noise suppression elements 202e extend across substantially the entire width 201w of the annular space 201a (see, e.g., FIGS. 3A-3C, described below), the diameter 212d of the noise isolation tools 212U, 212L may be sized so that there is a substantially close fit between the noise suppression elements 212e of the noise isolation tools 212U, 212L and an inside surface 201s of the production casing 201. As used herein, references to a "close fit" between a noise suppression elements 212e and the production casing 201 may depend on many different factors that are associated with both the wellbore 250 and the various design parameters of the noise isolation tools 212U, 212L. Of particular relevance in determining how closely the noise suppression elements 212e may be fit with the inside surface 201s of the production casing 201 are those factors that most directly affect the relative ease—or difficulty—of moving the noise logging system 215 up and down the wellbore 250. Therefore, some of the relevant factors that may affect what constitutes the aforementioned "close fit" include, among other things, the bore diameter 201d and out-of-roundness tolerance of the production casing 201, the finish and condition of the inside surface 201s of the casing 201 e.g., scale and/or wax buildup and the like, the magnitude of any directional changes (e.g., from a substantially vertical run) in the wellbore 250, the material and thickness of the noise suppression elements 212e (see, e.g., FIGS. 3A-3C and FIGS. 4A-4H, described below), as well as the overall stiffness and/or flexibility of the noise suppression elements 212e. Of the factors listed above, the material type, thickness, and overall flexibility of the noise suppression elements 212e are the factors that might be most readily controllable during the design and manufacturing phases of a representative noise isolation tool 212U, 212L, which therefore may be adjusted as required to meet a "close fit" configuration.

For example, in certain embodiments, such as when the materials and configuration of a given noise suppression element 212e provide a relatively high degree of overall element flexibility, the diameter 212d of the noise suppression elements 212e may be slightly greater than the nominal bore diameter 201d of the production casing 201, such that at least some portions of the noise suppression elements 212e actually contact the inside surface 201s. In such embodiments, the high degree of element flexibility may more readily facilitate the initial insertion of the noise isolation tools 212U, 212L into the bore 202 of the production casing 201. Furthermore, greater element flexibility may also permit the noise isolation tools 212U, 212L (and the noise logging system 215) to be moved up and down the wellbore 250 without undue effort, e.g., such as with the use of sinker bars or other mechanisms that are typically used for normal logging operations. In some illustrative embodiments, the diameter 212d may be in the range of approximately 1-5 mm greater than the nominal bore diameter 201d. In other embodiments, an even greater difference between the element diameter 212d and the nominal bore diameter 201d may be used, depending on the overall flexibility characteristics of the noise suppression elements 212e, as well as the configuration of the wellbore 250.

In other illustrative embodiments, it may be necessary to use less flexible, i.e. more stiff, noise suppression elements 212e on the noise isolation tools 212U, 212L, due to other tool operational considerations. For example, the required attenuation characteristics of the noise suppression elements 212e, and/or specific limitations based on the corrosivity or temperature of the wellbore fluid, may dictate the use of materials and/or configurations having a lower degree of flexibility than described in the previous embodiments. In such cases, the diameter 212d of the noise suppression elements 212e may be adjusted to be substantially the same as, or even slightly less than, the nominal bore diameter 201d of the production casing 201, thus allowing for tool deployment under normal logging conditions, as previously described. For example, in certain embodiments, the diameter 212d may range from approximately 0-5 mm less than the nominal bore diameter 201d, although it should be understood that the diameter 212d may be even more than 5 mm smaller than the diameter 201d, depending on the combination of factors outlined above.

Figure 3A:
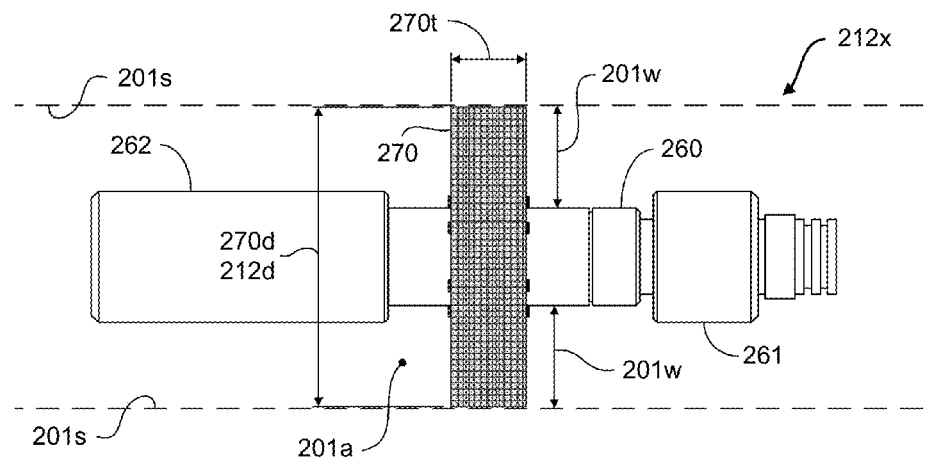
FIGS. 3A-3C are side elevation views of various exemplary embodiments of the noise isolation tools disclosed herein.
Figure 3B:
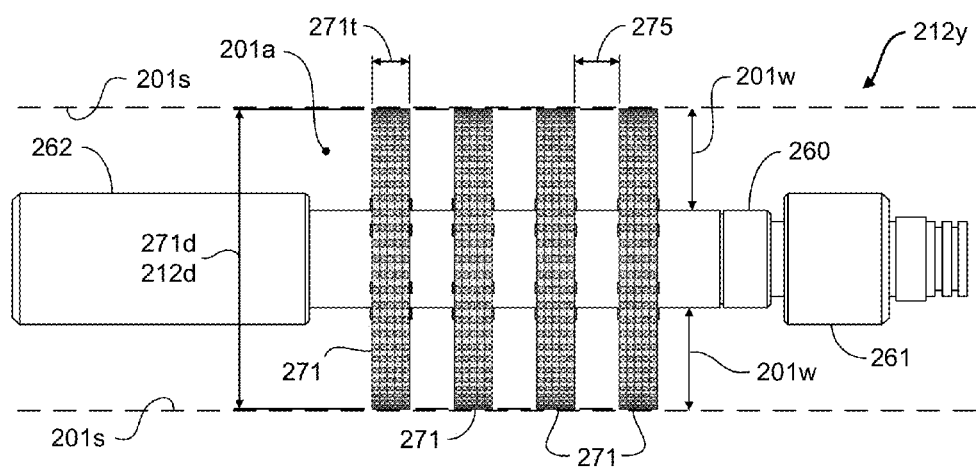
Figure 3C:
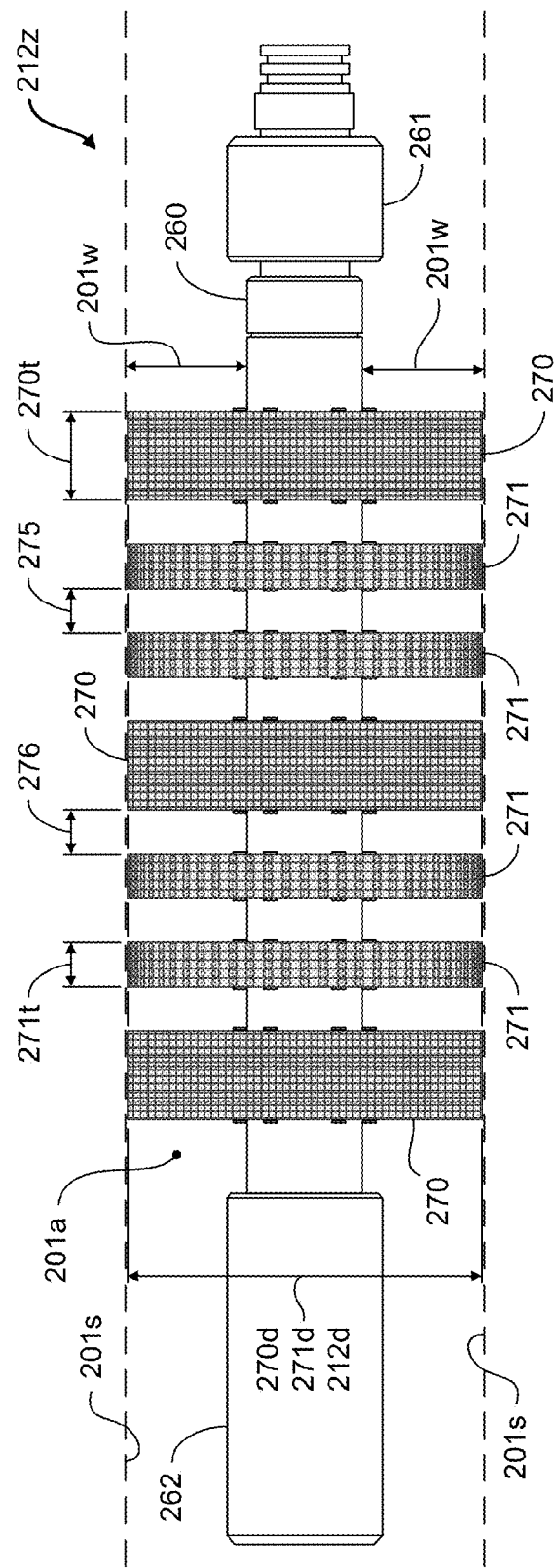

Accordingly, it should be understood that when there is a "close fit" between the noise suppression elements 212e and the inside surface 201s of the production casing 201 as described above, the noise suppression elements 212e extend radially across substantially the entire width 201w, e.g., approximately 95-100%, of the annular space 201a between the inside surface 201s of the production casing 201 and the body 260 of the noise isolation tools 212U, 212L (see, FIGS. 3A-3C, described below). In this way, any rogue noise event sound waves 230a, 230b bypassing the noise isolation tools 212U, 212L during a noise logging operation may be substantially minimized, or even prevented, depending on the overall materials and configuration of the noise suppression elements 212e and any specific differences in the diameters 212d and 201d, as described above. Additionally, further details relative to some aspects of the noise suppression elements 212e will be further described with respect to FIGS. 3A-3C and 4A-4H below.

In some embodiments, the diameter 212d of the noise suppression elements 212e on the upper noise isolation tool 212U may be the same as the diameter 212d of the noise suppression elements 212e on the lower isolation tool 212L. However, in certain other illustrative embodiments, the respective diameters 212d of the upper and lower noise isolation tools 212U, 212L may be different. For example, depending on the specific design requirements of the noise logging system 215, the noise suppression element 212e on the upper noise isolation tool 212U may extend across substantially the entire width 201w of the annular space 201a (see, FIGS. 3A-3C) while the noise suppression elements 212e on the lower noise isolation tool 212L only extend across a portion of the width 212w, such that the upper noise isolation tool 212U has a greater diameter 212d than that of the lower isolation tool 212L. In other embodiments, the diameter 212d of the upper isolation tool 212U may be smaller than the diameter 212d of the lower noise isolation tool 212L.

In certain illustrative embodiments of the present disclosure, the overall height of a respective isolation interval 240 where noise logging information is acquired may be substantially determined by the overall length of the noise logging system 215 that is used to perform the noise logging operations. For example, as is schematically depicted in FIG. 2A, the height of the targeted noise logging zone 240 may be defined by the distance between the upper and lower noise isolation tools 212U, 212L, with the noise logging tool 210 operatively coupled therebetween. Furthermore, it should be appreciated that the overall length of the noise logging system 215 may depend on many factors, such as the inside diameter of the production casing, the diameter and length of the noise logging tool, and the nature and extent of any directional changes in the wellbore 250. For example, in those applications wherein there are directional changes from a substantially vertical wellbore to a slanted and/or substantially horizontal wellbore, the placement of the noise isolation tools 212U, 212L may be affected due to the addition of other tools (not shown) to the noise logging system 215 that may be necessary for the deployment of the system 215 into a such applications, e.g., wellbore tractors for pushing the system 215 into and out of a horizontal leg of the wellbore, and the like. In some embodiments, the overall length of the noise logging system 25 may be on the order of approximately 5 meters, although it should be understood that both longer and shorter overall system lengths may also be appropriate.

FIG. 2B is a close-up view of the upper portion of the noise logging system 215 illustrated in FIG. 2A, including the upper noise isolation tool 212U. As noted above, the upper noise isolation tool 212U is configured so that there is a close fit between the diameter 212d of the noise suppression elements 212e and the production casing 201. In the illustrative embodiment schematically depicted in FIG. 2A, a radial clearance 212c is shown between the outside diameter 212d of the upper noise isolation tool 212U (i.e., the noise suppression elements 212e) and the inside surface of the production casing 201. As noted above, the clearance 212c is illustrative of an embodiment wherein less flexible, or more stiff, noise isolation element 212e may be used, thereby sometimes necessitating such a clearance 212c so that the noise logging system 215 may be moved within the bore 202 of the production casing 201 with comparatively little resistance. However, it should be appreciated that the diameter 212d of the noise suppression elements 212e may be the same as, or even slightly greater than, the diameter 201d of the production casing 201 in those embodiments wherein more flexible materials and/or configurations are used for the noise suppression elements 212e.

In certain illustrative embodiments, the lower noise isolation tool 212L (see, FIG. 2A) may have a substantially similar configuration as the upper noise isolation tool 212U shown in FIG. 2B and described above. Moreover, considerations regarding the relative differences between the diameter 212d of the lower noise isolation tool 212L and the diameter 201d of the production casing 201 may also be substantially as outlined above. As such, any specific details regarding the lower noise isolation tool 212L will therefore not be described herein in any further detail.

FIG. 3A depicts one illustrative embodiment of a noise isolation tool 212x that may be used together with any of the noise logging systems 215 of the present disclosure, such as, e.g., the upper and lower noise isolation tools 212U, 212L.

As shown in FIG. 3A, the noise isolation tool 212x may include a noise suppression element 270 (see, e.g., the noise suppression elements 212e of FIGS. 2A and 2B) that is mounted on a body 260, also referred to herein as a center mandrel 260, of the tool 212x. In some embodiments, the noise suppression element 270 may have a substantially circular ring or disc shaped configuration, such as that of a circularly shaped brush, as will be further described with respect to FIGS. 4A-4H below. The noise suppression element 270 may have an outside diameter 270d that substantially defines the outside diameter 212d of the noise isolation tool 212x (see, e.g., the upper and lower noise isolation tools 212U, 212L shown in FIGS. 2A and 2B). In certain exemplary embodiments, the diameter 270d of the noise suppression element 270 may range between approximately 2.25 inches and 6 inches, depending on the specific size of the production casing 201 used in the wellbore 250 and the requisite radial clearance 212c between the noise isolation tool 212x and the bore diameter 201d (see, FIG. 2B).

As shown in FIG. 3A, the noise suppression element 270 may have a thickness 270t that ranges from 0.5 inches and 2 inches, depending on the type of material that may be used for the noise suppression element 270, and the various relevant properties of that material, such as density, flexibility, and/or noise attenuation characteristics. For example, in at least some embodiments, the noise suppression element 270 may include a plurality of noise attenuation members, which may be up of, e.g., metal, plastic and/or rubber material, and the like, although other materials may also be used, depending on the desired characteristics of the noise suppression element 270. See, e.g., FIGS. 4A-4H, which are described in additional detail below.

The noise isolation tool 212x may also include a top sub 261 coupled to an upper end of the center mandrel 260 and a bottom sub 262 coupled to a lower end of the center mandrel 260, which may in turn be used to operatively couple the noise isolation tool to a wireline 211, a noise logging tool 210 (see, FIGS. 2A and 2B), or other wireline tools (not shown). For example, in those exemplary embodiments wherein the noise isolation tool 212x corresponds to the upper noise isolation tool 212U shown in FIGS. 2A and 2B, the top sub 261 may be used to operatively couple the noise isolation tool 212x to the wireline 211, whereas the bottom sub 262 may be used to operatively couple the noise isolation tool 212x to the noise logging tool 210. On the other hand, when the noise isolation tool 212x corresponds to the lower noise isolation tool 212L shown in FIG. 2A, the top sub 261 may be used to operatively couple the noise isolation tool 212x to the noise logging tool 210 and the bottom sub 262 may simply be plugged. Alternatively, the bottom sub 262 may be used to operatively couple the noise isolation tool 212x to a wireline stem/weight/sinker bar, which is sometimes used in wireline operations to add weight to a wireline tool string, thereby helping to "sink" the tool string against wellbore pressure and/or the different gravity fluid that may be encountered in a well.

FIG. 3B depicts another illustrative embodiment of a noise isolation tool 212y that may be used in conjunction with the noise logging system 215 disclosed herein, e.g., noise isolation tools 212U, 212L. As shown in FIG. 3B, the noise isolation tool 212y includes a plurality of spaced apart noise suppression elements 271, each of which is mounted on the body or center mandrel 260 of the tool 212y. The noise suppression elements 271 may each be separated by a space 275, the size of which may be adjusted as required so as to obtain the desired overall sound wave attenuation characteristics for the noise isolation tool 212y. In certain illustrative embodiments, the size of the space 275 between each adjacent noise suppression element 271 may be substantially uniform, whereas in other embodiments, the size of the space 275 may be substantially different from element to element.

As with the noise suppression element 270 described with respect to FIG. 3A above, the noise suppression elements 271 may also have a substantially circular ring or disc shaped configuration, such as, for example, a circularly shaped brush and the like. Furthermore, the noise suppression elements 271 may have an outside diameter 271d that may substantially define an outside diameter 212d of the noise isolation tool 212y, such as is shown for the upper and lower noise isolation tools 212U, 212L depicted in FIGS. 2A and 2B and described above. In some embodiments, the diameter 271d may range from 2.25 to 6 inches as described with respect to the noise suppression element 270 above, although other diameters may also be used.

As shown in FIG. 3B, each of the noise suppression elements 271 may have a thickness 271t that ranges from 0.5 inches and 2 inches, depending on the type of material and relevant properties of the various elements 271, and the overall design of the noise isolation tool 212y. For example, in certain illustrative embodiments, the noise suppression elements 271 may be made up of metal plastic, and/or rubber noise attenuation members, and the like, as previously noted with respect to the noise suppression element 270 described above. Additionally, in some embodiments, that the thickness 271t of each noise suppression element 271 may be the same, whereas in other embodiments, the thickness 271t of each element 271 may be different.

FIG. 3C illustrates yet another embodiment of an exemplary noise isolation tool 212z that may also be used in with any of the noise logging systems 215 disclosed herein, such as the noise isolation tools 212U, 212L. As depicted in FIG. 3C, the illustrative noise isolation tool 212z may include a combination of one or more spaced apart noise suppression elements 270 together with one or more spaced apart noise suppression elements 271. Depending on the overall design and the desired noise attenuation characteristics of the noise isolation tool 212z, each of the noise suppression elements 270 may be made up of a substantially different material than the noise suppression elements 271. For example, in some embodiments, the noise suppression elements 270 may include metal wires or bristles, and the noise suppression elements 271 may be made up of plastic and/or rubber noise attenuation members, and the like. See, e.g., FIGS. 4A-4H, which will be described in further detail below. Furthermore, the thickness 271t of the noise suppression elements 271 may be the same as, greater than, or less than thickness 270t of the noise suppression elements 270, based on the specific material characteristics of the elements 271, 270 and noise attenuation members the design requirements of the noise isolation tool 212z. Additionally, the spacing 275 between adjacent noise suppression elements 271 may also be different than the spacing 276 between a noise suppression element 271 and an adjacent noise suppression element 270, or between two adjacent noise suppression elements 270.

Moreover, while the outside diameters 270d and 271d of the respective noise suppression elements 270 and 271 may, as previously described, generally define the overall diameter 212d of the noise isolation tool 212z (see, e.g., the upper and lower noise isolation tools 212U, 212L of FIGS. 2A and 2B), the diameter 270d may be different from the diameter 271d. For example, based at least in part on the different materials that may be used to construct each of the noise suppression elements 270 and 271, the differences in material flexibility and/or stiffness may require somewhat different element diameters 270d and 271d, respectively, so as to properly facilitate the up and down movement of the noise isolation tool 212z within the bore 202 of the production casing 201, as previously described.

Accordingly, as shown in FIGS. 3A-3C and described above, various different embodiments of noise isolation tools, such as the noise isolation tools 212x-212z, are disclosed herein, each of which may include a single noise suppression element or a plurality of spaced apart noise suppression elements, such as the noise suppression elements 270 and/or 271. Furthermore, each of the noise suppression elements used on any one of the illustrative noise isolation tools of the present disclosure may be constructed of the same or different materials as compared to other noise suppression elements that may be used on the same noise isolation tool, have the same or different element thicknesses, and be spaced apart by the same or different distances. Moreover, the outside diameters of the various noise suppression elements disclosed herein may be adjusted so as to minimize as much possible as any rogue noise event sound waves from bypassing the noise isolation tools, while nonetheless still enabling the noise logging system to be moved inside of the production casing without substantial undue effort.

FIGS. 4A-4H, illustrate some embodiments of various exemplary noise suppression elements 280-283, respectively, that may be used in conjunction with any one of the noise isolation tools 212x-212z of the present disclosure. Accordingly, in the detailed description of FIGS. 4A-4H set forth below, it should be understood that the noise suppression elements 280-283 substantially correspond to noise suppression elements 212e schematically illustrated in FIGS. 2A and 2B, as well as any of the noise suppression elements 270, 271 illustrated in FIGS. 3A-3C.

FIG. 4A is an end elevation view of an illustrative noise suppression element 280, and FIG. 4B is a side elevation view of the noise suppression element 280 of FIG. 4A. The noise suppression element 280 may be constructed of a plurality of noise attenuation members 280a that are substantially radially mounted on a center mounting ring 280r. Furthermore, the plurality of noise attenuation members 280a are mounted around the circumference of the center mounting ring 280r in substantially continuous fashion so as to form a substantially circular disc shaped, or brush-like, configuration, thus allowing at least some of the wellbore sound energy to be substantially absorbed by the noise attenuation members 280a. The center mounting ring 280r may in turn be used to mount the noise suppression element 280 on any one of the noise isolation tools of the present disclosure, such as, for example, by mounting the noising suppression element 280 on the body or center mandrel 260 of any one of the noise isolation tools 212x-212z shown in FIGS. 3A-3C and described above. Furthermore, and depending on the specific design of the noise isolation tool, the center mounting ring 280r may be used together with any other appropriate mounting hardware, such as spacer rings and/or threaded locking rings and the like, to properly locate the noise suppression element 280 and any other noise suppression elements in the desired spaced apart locations along the length of the noise isolation tool, such as one of the noise isolation tools 212x-212z of FIGS. 3A-3C.

In some embodiments, the noise attenuation members 280a may be arranged around the center mounting ring 280r such that the noise attenuation members 280a form a substantially continuous ring or disc-like shape having a thickness 281t. Furthermore, the noise attenuation members 280a may be adapted to attenuate extraneous sound waves traveling past the noise suppression element 280, such as, for example, the rogue noise event sound waves 230a or 230b travelling through a wellbore 250 of an oil and gas well during a noise logging operation. See, FIGS. 2A and 2B. Depending on the size, configuration, and/or materials of the noise attenuation members 280a, sound wave attenuation may be accomplished by scattering and/or absorbing the sound waves, as noted above. As shown in FIG. 4A, the noise attenuation members 280a may be nominally separated by a space 280s, which is adapted to allow fluid that may be present in bore 202 of the production casing to pass through the noise suppression element 280 as the noise logging system 215 is moved up and down the wellbore 250. See, e.g., FIGS. 2A and 2B. In certain exemplary embodiments, the noise attenuation members 280a of the noise suppression element 280 may be twisted and/or crimped metal wires or strands, e.g., wire bristles. Furthermore, the noise attenuation members 280a may be made up of any one or more of a variety of well-known metal wire materials, such as, for example, steel, stainless steel, brass and the like. It should be appreciated, however, that the ultimate material selection for the wires may depend on the type of fluid or fluids that the noise suppression element 280 may be exposed to during a noise logging operation. Moreover, the specific wire gauge used for the noise attenuation members 280a may also be adjusted as required so as to provide the requisite sound wave attenuation characteristics, as well as the desired overall flexibility or stiffness of the noise suppression element 280. For example, the wire gauges used for the noise attenuation members 280a may range from 20 GA (course gauge) to 38 GA (fine gauge), depending on the desired wire characteristics, although it should be understood that other wire gauges may also be used.

The noise suppression element 280 may have an outside diameter 280d that substantially conforms to the desired diameter 212d of a specific noise isolation tool 212U, 212L, and so as to provide the necessary radial clearance 212c with the bore diameter 201d of the production casing 201 (see, FIGS. 2A and 2B). Furthermore, the thickness 280t of the noise suppression element 280 may be adjusted as required based on the various relevant parameters previously described above, e.g., flexibility and/or stiffness, sound wave attenuation, etc.

Figures 4C, 4D:
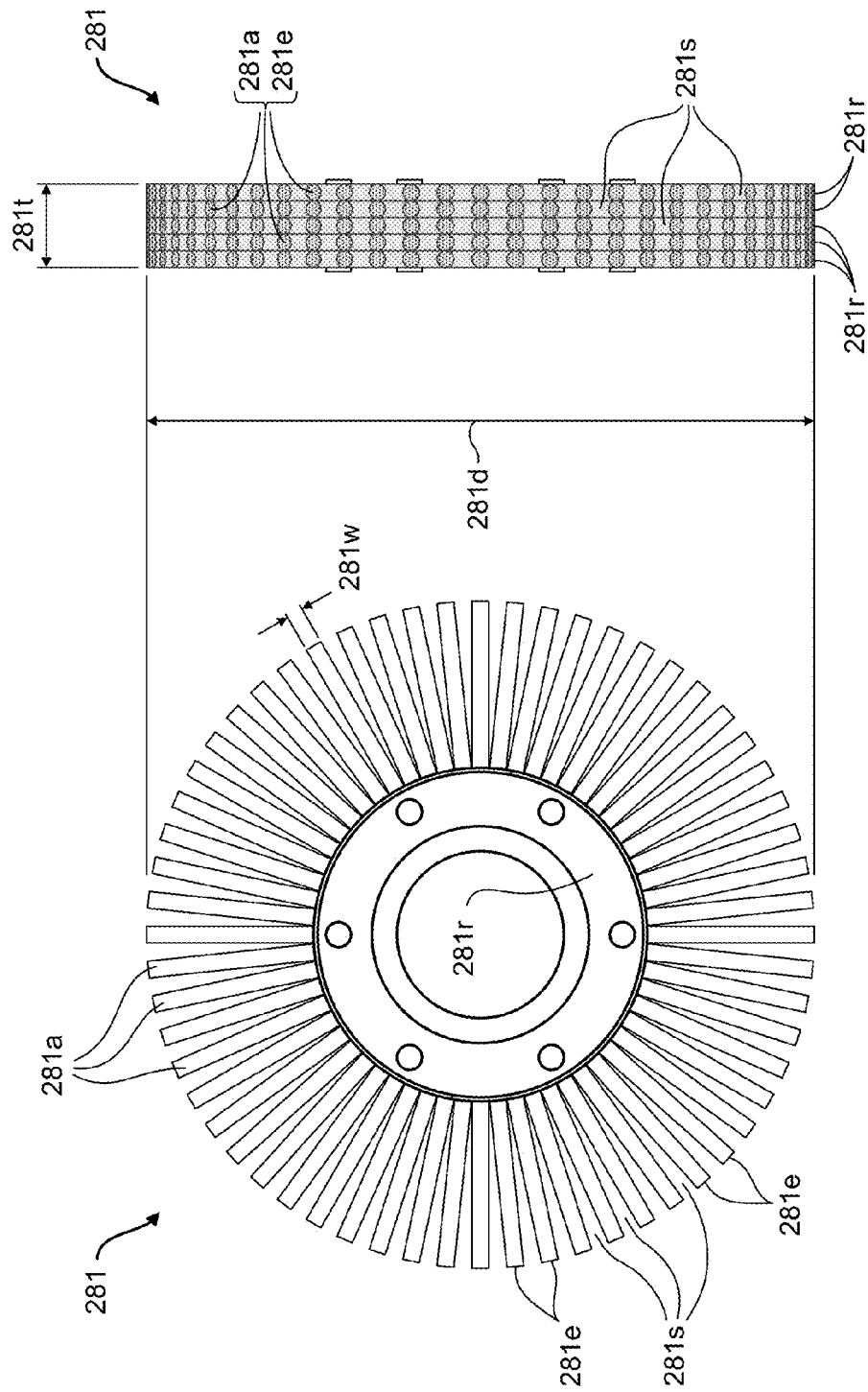

FIGS. 4C and 4D depict end and side elevation views, respectively, of another illustrative noise suppression element 281 that may be used with any one of the various exemplary noise isolation tools disclosed herein. As shown in FIG. 4C, the noise suppression element 281 may include a plurality of noise attenuation members 281a having a substantially circular cross-sectional shape that are substantially radially mounted on a center mounting ring 281r, which in turn be used to mount the noise suppression element 281 on the body or center mandrel 260 of any one of the noise isolation tools 212x-212z shown in FIGS. 3A-3C and described above. Additionally, as with the noise suppression element 280 shown in FIGS. 4A and 4B, plurality of noise attenuation members 281a are mounted around the circumference of the center mounting ring 281r so as to form a substantially circular disc shaped configuration. In certain embodiments, the noise attenuation members 281a may be any suitable plastic material, such as nylon and the like, which may be adapted to scatter and/or absorb sound waves, as well as provide the requisite degree of flexibility and/or stiffness, as previously described. Depending on the design parameters of the noise suppression element 281, the noise attenuation members 281a may have an elongated cylindrical shape, e.g., round bristles. Furthermore, the noise attenuation members 281a may be of a substantially solid configuration, or the noise attenuation members 281a may be made up of a plurality of individual plastic strands or fibers that are twisted or braided together into an elongated and substantially cylindrical bristle-like shape. Furthermore, the ends 281e of the noise attenuation members 281a may be nominally separated by spaces 281s so as to permit the noise suppression element 281 to be moved through any fluid medium that may be present in the bore 202 of the production casing 201 (see, FIGS. 2A and 2B), and/or to ensure that individual noise attenuation members 281a are able to flex or move relative to adjacent noise attenuation members 281a.

In other illustrative embodiments, the noise attenuation members 281a may be made up of any suitable rubber material, for example, a foam rubber material such as an ethylene vinyl acetate (EVA) foam or polyurethane (PU or PUR) foam material. Additionally, foam rubber noise attenuation members 281a may be substantially solid elongated cylindrical members, or they may be hollow tubular members, depending on the desired degree of flexibility and/or noise attenuation characteristics, including the absorption and/or scattering of wellbore acoustical energy.

The noise suppression element 281 may have an outside diameter 281d that substantially conforms to the required diameter 212d of a given noise isolation tool 212U, 212L (see, FIGS. 2A and 2B), as well as an overall element thickness 281t. As noted with respect to the noise suppression element 280 above, both the diameter 281d and the thickness 281t of the noise suppression element 281 may be adjusted as required so as to provide the overall sound wave attenuation and element flexibility characteristics as may be required for the specific noise isolation tool 212U, 212L.

As shown in FIG. 4D, the noise attenuation members 281a may be arranged around the center mounting ring 281r in a plurality of rows or levels 281r, such that the entirety of the noise attenuation members form the disc-like shaped configuration described above having an overall element thickness 281t. The specific number of rows 281r of noise attenuation members 281a may depend on the various design parameters of the noise suppression element 281, such as size (e.g., the width or diameter 281w), element thickness 281t, and the like. In certain embodiments, the width or diameter 281w may be in the range of approximately 1-5 mm, although it should be understood that smaller and/or large sizes may also be used. Moreover, it should also be appreciated that noise attenuation members 281a with different diameters 281w may be used on the same noise suppression element 281. In some embodiments, an illustrative noise suppression element 281 may include 5-10 rows 281r of noise attenuation members 281a, although both fewer and greater numbers of rows may also be considered, depending on the requisite overall thickness 281t, flexibility, and noise attenuation characteristics of the noise suppression element 281.

It should be noted that the plurality of noise attenuation members 281a are illustrated in FIG. 4D for convenience and exemplary purposes only, and as such it should be understood that the ends 281e of the various noise attenuation members 281a (depicted in FIG. 4 as circles or ellipses) in each of the adjacent rows 281r may not typically be arranged in such a substantially aligned manner. In other words, the noise attenuation members 281a in a particular row 281r may not necessarily be intentionally be aligned with the noise attenuation members 281a in other adjacent rows 281r, such that the spaces 281s between the ends 281e of the noise attenuation members 281a progress across the thickness 281t of the noise suppression element 281 in a substantially straight and uninterrupted fashion (as is depicted in FIG. 4D for illustrative purposes only). Instead, the noise attenuation members 281a may only be generally positioned randomly relative to any adjacent noise attenuation member 281a, and as such, any specific alignment between adjacent noise attenuation members 281a may only be coincidental, thereby potentially enhancing the noise attenuation, i.e., scattering and absorption, properties of the noise suppression element 281.

FIGS. 4E and 4F show yet another illustrative noise suppression element 282 that may be used with any one of the noise isolation tools of the present disclosure. As shown in FIG. 4E, the noise suppression element 282 may include a plurality of substantially radially oriented noise attenuation members 282a having a substantially rectangular cross-sectional shape that are substantially continuously mounted around the circumference of a center mounting ring 282r in similar fashion to the noise attenuation members 281a of the noise isolation element 281 and/or the noise attenuation members 280a of the noise isolation element 280 described above, such that the noise suppression element 282 has a substantially circular disc shaped configuration. Furthermore, the center mounting ring 282r may in turn be used to mount the noise suppression element 282 on the body or center mandrel 260 of any one of the noise isolation tools 212x-212z shown in FIGS. 3A-3C and described above Additionally, the ends of the noise attenuation members 282a may be separated by a space 282s so as to permit relatively easy movement of the noise suppression element 282 through any fluid or fluids that may be present in the bore 202 of a production casing 201, as previously described. The material of the noise attenuation members 282a may be any suitable material disclosed herein, such as, for example EVA or PU foam rubber and the like, although it should be understood that other materials may also be used.

As noted above, the noise attenuation members 282a may have a substantially rectangular cross section with a cross-sectional width 282w and a cross-sectional length 282L, e.g., elongated rectangular bristles. In certain embodiments, the cross-sectional length 282L of the noise attenuation members 282a may be substantially the same as the overall thickness 282t of the noise suppression element 282, as shown in FIG. 4F. In other embodiments, the cross-sectional lengths of the noise attenuation members 282a may not extend for the full thickness 282t of the noise suppression element 282t. Instead, a plurality of rows 282r of noise attenuation members 282a (three are schematically illustrated in FIG. 4F by the dashed lines 282x) having shorter cross-sectional lengths, such as a cross-sectional length 282n, may be used to make up the full thickness 282t of the noise suppression element 282t. Additionally, any given row 282r of noise attenuation members 282a having a shorter cross-sectional length 282n may be further separated from an adjacent row 282r by a gap or space (not shown) so as to enable any fluid in the bore 202 of production casing 201 to move between the rows 282r as the noise suppression element 282 is moved up or down a wellbore 250 (see, FIGS. 2A and 2B). Moreover, as with the rows 281r of noise attenuation members 281a on the noise suppression element 281 illustrated in FIGS. 4C and 4D, the spaces 282s between the ends 282e of the noise attenuation members 282a may not be substantially aligned with the ends 282e of adjacent noise attenuation members 282a, thus enhancing the noise attenuation characteristics of the noise suppression element 282.

As shown in FIGS. 4E and 4F, the noise suppression element 282 may have a diameter 282d that substantially corresponds to the diameter of a respective noise isolation tool, such as the diameter 212d of the upper and/or lower noise isolation tools 212U, 212L shown in FIGS. 2A and 2B. Furthermore, the specific diameter 282d may be adjusted based upon the desired noise attenuation characteristics and desired flexibility of the noise suppression element 282 as described above.

FIGS. 4G and 4H depict end and side elevation views, respectively, of a further exemplary embodiment of a noise suppression element 283 according to the present disclosure, which may also be used with any of the illustrative noise isolation tools described herein. As shown in FIGS. 4G and 4H, the noise suppression element 283 includes a substantially solid disc or ring 283a that is mounted on and extends radially from a center mounting ring 283r, thereby forming a substantially disc-like configuration similar to the noise suppression elements 280-282 described above. The noise suppression element 283 has an outside diameter 283d and an overall thickness 283t which may be adapted as described above to adjust the noise attenuation characteristics of the noise suppression element 283, and to facilitate movement of the element 283 within the bore 202 of a production casing 201 (see, FIGS. 2A and 2B). Furthermore, due to the substantially solid nature of the ring 283a, the material of the ring 283a may generally be a more flexible material, such as EVA or PU foam rubber and the like, so that the noise suppression element 283 may be moved up or down the bore 202 of the production casing 201 without undue effort.

As noted previously, any noise isolation tools of the present disclosure, such as the noise isolation tools 212U, 212L of FIGS. 2A and 2B or the noise isolation tools 212x-212z of FIGS. 3A-3C, may utilize one or more of the various embodiments of noise suppression elements 280-283 shown in FIGS. 4A-4H and described above. Furthermore, it should be appreciated by one of ordinary skill in the art after a full reading the present disclosure that any one of the various configurations and/or material components of the noise suppression elements 280-283 may be used in combination with any other material and/or configuration of noise suppression elements 280-283 on the same noise isolation tool, without limitation or exception.

Figure 5:
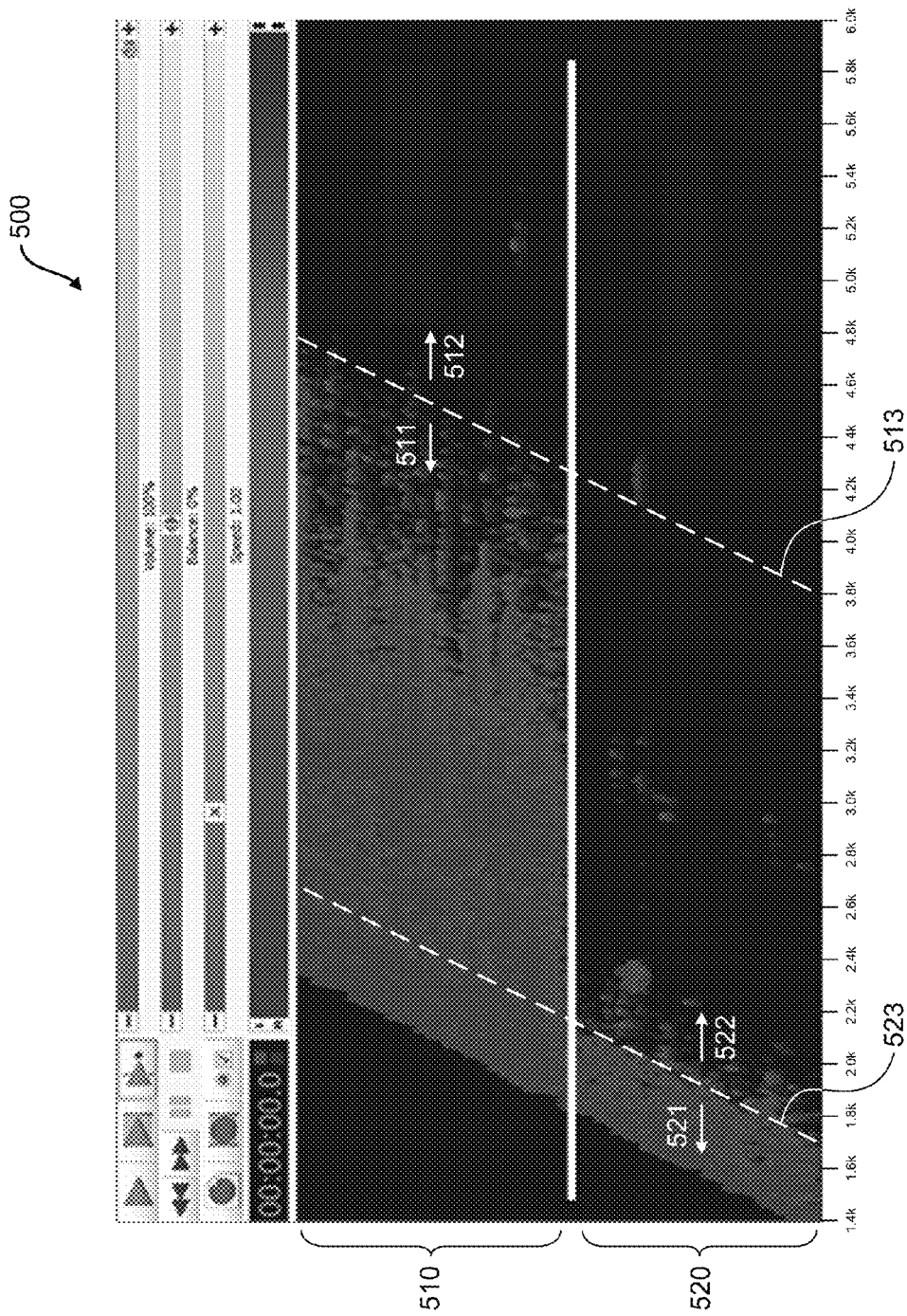
FIG. 5 is a graphical depiction of representative noise data associated with noise tests that were performed by the inventor using a prior art noise logging tool, compared with noise data obtained during noise tests that were performed by the inventor using a noise logging system that utilizes the noise isolation tools of the present disclosure.

FIG. 5 is a graphical depiction 500 of representative noise data associated with noise tests that were performed by the inventor using only a noise logging tool (i.e., testing as represented by the data of region 510), compared with noise data obtained during noise tests that were performed by the inventor after coupling an exemplary noise isolation tool of the present disclosure to the noise logging tool (as represented by the data of region 520). Both the noise test 510 and the noise test 520 were performed in a laboratory mock-up that simulated typical wellbore logging conditions (although under atmospheric pressures), with only one variable—i.e., the inclusion or exclusion of a noise isolation tool—so that a comparative determination of the influence of the tested noise isolation tool on the acquired data could be made. In general, the noise test 510 was performed by simulating gas-generated noise traveling down the fluid in a wellbore a toward a typical noise logging tool without a noise isolation tool being used, followed by a substantially identical noise test 520, wherein however an exemplary noise isolation tool was positioned between the noise source and the noise logging tool. For the noise test 520, the tested noise isolation tool was configured similar to the noise isolation tool 212z shown in FIG. 3C. Furthermore, the noise suppression elements used for the noise test 520 included only a metal wire bristle configuration, similar to the noise suppression element 280 shown in FIG. 4A.

In FIG. 5, the upper portion of the graph 500 displays noise data for the noise logging test 510, and the lower portion of the graph displays the noise data for the noise logging test 520. The x-axis of the graphical display represents noise response frequency in kHz, and the y-axis represents time. For illustrative purposes only, the y-axis has been illustrated at a 60° angle relative to the x-axis, so as to provide a ready comparison between the noise test 510 (without noise isolation tools) and the noise test 520 (with noise isolation tools). Furthermore, the lighter color shown in FIG. 5 reflects the data recorded during testing, wherein the difference between data shown for the noise tests 510 and 520 is roughly indicative of how much was absorbed by the noise isolation tool, i.e., did not reach—and was not recorded by—the noise logging tool.

As illustrated in FIG. 5, the noise test 510 indicates that noise data (indicated by reference number 511) was acquired with frequencies ranging all the way up to approximately 3.8 kHz (represented by the dashed line 513), which includes noise frequencies that are representative of both gas releases and rogue noise events. Above 3.8 kHz, the noise data (indicated by reference number 512) shows that the noise frequencies associated with rogue noise events are substantially dissipated, thus indicating that the mixing of different noise signatures (e.g., from rogue noise events and SCVF/GM source noise) that might typically occur during a noise logging operation may be substantially reduced, or even prevented. Accordingly, the noise test 510 that was run using a noise logging tool without the use of the noise isolation tools of the present disclosure would indicate that all of the noise data 511 up to approximately 3.8 kHz would typically have to be evaluated and interpreted in an effort to determine the locations of any relevant SCVF/GM sources—a situation which could lead to data interpretation errors, as described above.

On the other hand, the noise test 520 shows that most of the noise data (indicated by reference number 521) acquired during the test reflects frequency responses that are, for the most part, below approximately 1.7 kHz (represented by the dashed line 523). On the other hand, FIG. 5 also shows that the amount of noise data (indicated by reference number 522) having frequencies above the 1.7 kHz level was significantly reduced during the noise test 520. The data from the noise test 520 would therefore indicate that noise frequencies up to approximately 1.7 kHz (noise data 521)—a range that is often associated with the type of frequency response generally exhibited by gas releases—was readily detected during the tests, whereas noise frequencies above 1.7 kHz (noise data 522)—which is often associated with the frequency response of rogue noise events—was substantially minimized during the test 520. Moreover, in those applications wherein the noise suppression elements mounted on a noise isolation tool are made up of a material having substantially greater noise absorption characteristics than the metal wire bristle configuration that was used for the noise test 520—e.g., the plastic and/or rubber bristles described above—the inadvertent detection of additional rogue noise event frequencies below 1.7 kHz may be even further reduced. Accordingly, the representative noise data 510, 520 depicted in graph 500 of FIG. 5 would indicate that the use of the exemplary noise isolation tools disclosed herein during a noise logging operation that is performed to detect and locate relevant SCVF/GM gas sources may greatly improve the likelihood of acquiring an overall cleaner, and hence more interpretable, sound record.

As a result, the subject matter of the present disclosure provides details of some aspects of various configurations of noise isolation tools that may be used in conjunction with a noise logging system so as to substantially reduce the detrimental effects that extraneous rogue noise events may have on the various noise samples that are acquired by a noise logging tool during a noise logging operation.

The particular embodiments disclosed above are illustrative only, as the invention may be modified and practiced in different but equivalent manners apparent to those skilled in the art having the benefit of the teachings herein. For example, the method steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A noise isolation tool that is adapted to be used in a noise logging operation, the noise isolation tool comprising:
   a body;
   a first noise suppression element mounted on said body, said first noise suppression element having a substantially circular disc shaped configuration that is adapted to extend radially across at least a portion of a width of an annular space between said body and an inside surface of a wellbore casing during said noise logging operation; and
   a second noise suppression element mounted on said body, wherein a configuration of said second noise suppression element is different from a configuration of said first noise suppression element.

2. The noise isolation tool of claim 1, wherein at least one of said first and second noise suppression elements is adapted to extend radially across substantially said entire width of said annular space.

3. The noise isolation tool of claim 2, wherein at least one of said first and second noise suppression elements is adapted to contact said inside surface of said wellbore casing during said noise logging operation.

4. The noise isolation tool of claim 1, wherein at least one of said first and second noise suppression elements comprises a plurality of spaced apart noise suppression elements, each of said plurality of spaced apart noise suppression elements being adapted to extend radially across at least a portion of said width of said annular space.

5. The noise isolation tool of claim 1, wherein a thickness of said first noise suppression element is greater than a thickness of said second noise suppression element.

6. The noise isolation tool of claim 1, wherein said first noise suppression element comprises a plurality of first noise attenuation members having a first configuration and comprising a first material and said second noise suppression element comprises a plurality of second noise attenuation members having a second configuration and comprising a second material.

7. The noise isolation tool of claim 6, wherein at least one of said first configuration and said first material of said first noise attenuation members is different from a corresponding one of said second configuration and said second material of said second noise attenuation members.

8. The noise isolation tool of claim 1, wherein at least one of said first and second noise suppression elements comprises a plurality of substantially radially oriented noise attenuation members.

9. The noise isolation tool of claim 8, wherein said plurality of noise attenuation members are substantially continuously mounted around a circumference of said at least one of said first and second noise suppression elements.

10. The noise isolation tool of claim 8, wherein at least some of said plurality of noise attenuation members comprise wire bristles.

11. The noise isolation tool of claim 8, wherein at least some of said plurality of noise attenuation members comprise bristles having at least one of a circular cross section and a rectangular cross section.

12. The noise isolation tool of claim 8, wherein said plurality of noise attenuation members comprise at least one of metal, plastic, and rubber.

13. The noise isolation tool of claim 8, wherein at least some of said plurality of noise attenuation members are adapted to contact said inside surface of said wellbore casing during said noise logging operation.

14. A noise isolation tool, comprising:
    a body;
    a plurality of first spaced-apart noise suppression elements mounted on said body, each of said plurality of first noise suppression elements comprising a plurality of substantially radially oriented noise attenuation members circumferentially mounted on said noise suppression element, wherein each of said plurality of substantially radially oriented noise attenuation members are adapted to extend radially across an entire width of an annular space between said body and an inside surface of a wellbore casing, and at least some of said plurality of substantially radially oriented noise attenuation members are adapted to contact said inside surface during a noise logging operation; and
    at least one second noise suppression element mounted on said body, wherein said at least one second noise suppression element is positioned between two of said plurality of said first spaced-apart noise suppression elements.

15. The noise isolation tool of claim 14, wherein said plurality of noise attenuation members comprise at least one of plastic and rubber bristles.

16. This noise isolation tool of claim 14, wherein at least one of a material and a configuration of said at least one second noise suppression element is different from a respective one of a material and configuration of at least one of said plurality of said first spaced-apart noise suppression elements.

17. A noise isolation tool comprising a body and first and second noise suppression elements mounted on said body, wherein said noise isolation tool is adapted to be operatively coupled to a noise logging tool, said first noise suppression element comprising a plurality of substantially radially oriented noise attenuation members that are substantially continuously mounted around a circumference of said first noise suppression element and said second noise suppression element having a different configuration from said first noise suppression element, wherein said first and second noise suppression elements are adapted to attenuate sound waves traveling along a wellbore of a well when said noise isolation tool and said noise logging tool operatively coupled thereto are positioned in said wellbore during a noise logging operation.

18. A noise logging system that is adapted to perform a noise logging operation on a wellbore, the noise logging system comprising:
a noise logging tool; and
a noise isolation tool that is operatively coupled to said noise logging tool, said noise isolation tool comprising:
a first noise suppression element that extends substantially radially away from a body of said noise isolation tool; and
a second noise suppression element that extends substantially radially away from said body of said noise isolation tool, wherein a configuration of said second noise suppression element is different from a configuration of said first noise suppression element.

19. The noise isolation tool of claim 18, wherein at least one of said first and second noise suppression elements comprises a plurality of substantially radially oriented noise attenuation members.

20. The noise isolation tool of claim 19, wherein said plurality of noise attenuation members are substantially continuously mounted around a circumference of said at least one of said first and second noise suppression elements.

21. A noise logging system that is adapted to perform a noise logging operation on a wellbore, the noise logging system comprising:
a noise logging tool;
an upper noise isolation tool that is operatively coupled to an upper end of said noise logging tool, said upper noise isolation tool comprising at least one noise suppression element mounted on a body of said upper noise isolation tool, wherein said at least one noise suppression element has a substantially circular disc shaped configuration that is adapted to extend radially across at least a portion of a width of an annular space between said body and an inside surface of a casing comprising said wellbore; and
a lower noise isolation tool that is operatively coupled to a lower end of said noise logging tool.

22. The noise logging system of claim 21, wherein said at least one noise suppression element is adapted to extend radially across substantially said entire width of said annular space.

23. The noise logging system of claim 21, wherein said at least one noise suppression element comprises a plurality of spaced apart noise suppression elements, each of said plurality of noise suppression elements being adapted to extend radially across at least said portion of said width of said annular space.

24. The noise logging system of claim 21, wherein said at least one noise suppression element comprises a plurality of substantially radially oriented noise attenuation members that are substantially continuously mounted around a circumference of said at least one noise suppression element.

25. The noise logging system of claim 21, wherein said upper noise isolation tool is operatively coupled to a wireline, said wireline being adapted to support said noise logging system, move said noise logging system along said wellbore, and transmit logging information acquired by said noise logging tool during said noise logging operation.

26. The noise logging system of claim 21, wherein said noise isolation tool is adapted to attenuate sound waves traveling along said wellbore during said noise logging operation.

27. The noise logging system of claim 26, wherein said noise isolation tool is adapted to substantially prevent said noise logging tool from detecting said attenuated sound waves during said noise logging operation.

28. A method for performing a noise logging operation, the method comprising:
operatively coupling a noise logging system to a wireline, said noise logging system comprising an upper noise isolation tool that is operatively coupled to an upper end of a noise logging tool and a lower noise isolation tool that is operatively coupled to a lower end of said noise logging tool;
positioning said noise logging system in a targeted noise logging zone with said wireline, wherein said targeted noise logging zone is defined by a distance between said upper and lower noise isolation tools; and
attenuating sound waves originating from noise sources located outside of said targeted noise logging zone with at least said upper noise isolation tool while acquiring noise logging data originating from noise sources located within said targeted noise logging zone with said noise logging tool.

29. The method of claim 28, wherein attenuating said sound waves originating from said noise sources located outside of said targeted noise logging zone with said at least said upper noise isolation tool comprises substantially preventing said noise logging tool from detecting said sound waves originating from said noise sources located outside of said targeted noise logging zone.

30. The method of claim 28, further comprising mounting at least one noise suppression element on at least one of said upper and lower noise isolation tools and using said at least one noise suppression element to attenuate said sound waves originating from said noise sources located outside of said targeted noise logging zone, said at least one noise suppression element having a substantially circular disc shaped configuration that that extends radially across at least a portion of a width of an annular space between a body of said noise isolation tool and an inside surface of a wellbore casing.

31. The method of claim 30, further comprising contacting said inside surface of said wellbore casing with said at least one noise suppression element during said noise logging operation.

32. The method of claim 30, wherein said at least one noise suppression element comprises a plurality of substantially radially oriented noise attenuation members that are substantially continuously mounted around a circumference of said at least one noise suppression element.

33. The method of claim 32, further comprising contacting said inside surface of said wellbore casing with at least some of said plurality of substantially radially oriented noise attenuation members during said noise logging operation.

34. The method of claim 28, further comprising using said upper noise isolation tool to attenuate sound waves originating from noise sources located above said targeted noise logging zone and using said lower noise isolation tool to attenuate sound waves originating from noise sources located below said targeted noise logging zone.

* * * * *

UNITED STATES PATENT AND TRADEMARK OFFICE
CERTIFICATE OF CORRECTION

PATENT NO.        : 9,453,405 B2
APPLICATION NO.   : 13/776192
DATED             : September 27, 2016
INVENTOR(S)       : Jude Reid Page 1 of 1

It is certified that error appears in the above-identified patent and that said Letters Patent is hereby corrected as shown below:

In the Claims

Column 22, Line 47 (Claim 16, Line 1), change "This" to "The".

Column 22, Line 50 (Claim 16, Line 4), after "material and" insert --a--.

Signed and Sealed this
Twentieth Day of March, 2018

Andrei Iancu
*Director of the United States Patent and Trademark Office*